(12) United States Patent
Ortiz

(10) Patent No.: US 12,738,750 B2
(45) Date of Patent: Sep. 15, 2026

(54) POWER CONSERVATION APPARATUS

(71) Applicant: Jorge Ortiz, Puerto Rico, PR (US)

(72) Inventor: Jorge Ortiz, Puerto Rico, PR (US)

( * ) Notice: Subject to any disclaimer, the term of this patent is extended or adjusted under 35 U.S.C. 154(b) by 658 days.

(21) Appl. No.: 18/218,506

(22) Filed: Jul. 5, 2023

(65) Prior Publication Data

US 2024/0022088 A1 Jan. 18, 2024

Related U.S. Application Data

(60) Provisional application No. 63/390,068, filed on Jul. 18, 2022.

(51) Int. Cl.
*H02J 7/50* (2026.01)
*H02J 7/35* (2006.01)

(52) U.S. Cl.
CPC . *H02J 7/50* (2026.01); *H02J 7/35* (2013.01)

(58) Field of Classification Search
CPC ..................................... H02J 7/35; H02J 7/50
See application file for complete search history.

(56) References Cited

U.S. PATENT DOCUMENTS

| | | | | |
|---|---|---|---|---|
| 9,086,461 | B2 | 7/2015 | Yang et al. | |
| 10,637,283 | B2 | 4/2020 | Ding et al. | |
| 10,658,867 | B2 | 5/2020 | Ding et al. | |
| 11,031,792 | B2 * | 6/2021 | Wagoner | H02J 3/32 |
| 11,361,392 | B2 | 6/2022 | Bhattarai et al. | |
| 2019/0140460 | A1 * | 5/2019 | Qiu | H02J 7/52 |
| 2020/0127467 | A1 * | 4/2020 | Li | H02J 7/36 |
| 2020/0311649 | A1 * | 10/2020 | Dhaliwal | G06Q 30/0627 |
| 2021/0129700 | A1 * | 5/2021 | Song | B60R 16/033 |
| 2021/0216429 | A1 * | 7/2021 | Chiang | G06F 11/2221 |
| 2022/0111220 | A1 * | 4/2022 | Allavatam | A61N 1/3987 |
| 2022/0149721 | A1 * | 5/2022 | Gannamaneni | H02J 7/06 |
| 2022/0344732 | A1 * | 10/2022 | Beuning | H01M 10/441 |
| 2022/0379755 | A1 * | 12/2022 | Tanner | B60L 53/305 |
| 2022/0385089 | A1 * | 12/2022 | Silorio | H02J 7/80 |
| 2024/0429728 | A1 * | 12/2024 | Abbott | H02J 7/44 |

* cited by examiner

*Primary Examiner* — Thien M Le
(74) *Attorney, Agent, or Firm* — Kirk A. Buhler; Buhler & Associates Patenting

(57) ABSTRACT

Improvements in a power conservation apparatus to conserve power that can be wasted. The power conservation allows for all or nearly all the energy to remain in the system for future or stored use. At least two separate storage batteries are separately connected to a controller. The controller provides two functions of monitoring the voltage of each separate storage batteries to determine the charge level and the amount of available power remaining in each separate storage batteries. The controller also switches between the separate storage batteries at the optimal voltage to maintain power to the entire system. The battery storage size or amperage and voltage is selected based upon the maximum power demand. The two or more separate battery systems are connected or selected by a controller. The apparatus operates to provide power to the house/building by monitoring and controlling available power systems.

16 Claims, 4 Drawing Sheets

POWER CONSERVATION APPARATUS

CROSS-REFERENCE TO RELATED APPLICATIONS

This application claims the benefit of Provisional Application Ser. No. 63/390,068 filed Jul. 18, 2022, the entire contents of which is hereby expressly incorporated by reference herein.

PRIOR ART

U.S. Pat. No. 9,086,461 issued on Jul. 21, 2015, to Jong-Woon Yang et al., and is titled Circuit for Measuring Voltage of Battery and Power Storage System Using the Same. This patent discloses a circuit for measuring voltage of a battery and a power storage system using the same. According to one aspect, the circuit includes a switching element connected to the battery and configured to output a first signal at a first voltage level. The switching element is configured to be turned-on in response to a voltage measuring control signal. The circuit also includes a voltage conversion circuit connected to the switching element. An analog-digital converter is configured to receive the second signal and convert the received second signal into a digital signal. While this system uses multiple separate battery storage it does not transfer use and charging between the separate battery storage.

U.S. Pat. Nos. 10,637,283 and 10,658,867 issued on Apr. 28, 2020, and May 19, 2020, respectively to Qigang Ding et al., and is titled Power Supply System and Method. This patent discloses a power supply system and method includes a power grid input unit and a diesel generator input unit, separately used for supplying an alternating current to a power supply unit. An automatic transfer switch unit is connected to the power grid input unit and the power supply unit or connected to the diesel generator input unit and the power supply unit, which is used for converting the received alternating current into a direct current. The power supply system also includes a storage battery and an alternating current electric equipment group. This system uses power from either a storage battery or an external power supply and not multiple battery sources.

U.S. Pat. No. 11,361,392 issued on Jun. 14, 2022, to Bishnu Bhattarai and is titled Flexible Allocation of Energy Storage in Power Grid. This patent discloses methods and apparatus that provide flexible allocation and regulation of scheduled energy transfers between energy storage devices ("batteries") and a power grid. Piecewise mappings having at least one sloping segment enable gradual variations in scheduled energy transfers as cleared values of a medium of energy exchange deviate from predicted values of the medium of energy exchange. Thereby deviations from a battery's predicted energy transfer schedule can be reduced, and overall smoother operation of a power grid can be achieved. Two sloping linear segments can be separated by a dead band, a portion of the mapping in which the scheduled energy transfer amount is invariant. While this invention monitors the power grid for switching it does not provide a charging between battery sources.

What is needed is a power conservation apparatus that transfers use and power between two or more battery sources to maintain power at a building or house. The proposed power conservation apparatus provides the solution.

BACKGROUND OF THE INVENTION

There has long been a need to conserve power, generate or save power to ensure efficient use. Batteries provide a storage for energy that can be used or converted for use in a building. As a battery is discharged, the battery needs to be recharged for future use. Most systems will recharge a single battery that is charged from solar power, power from the grid or generators when surplus power is available. The charged battery is used to power a building or home in the evenings when insufficient external power is available. A number of patents and or publications have been made to address these issues. Exemplary examples of patents and or publication that try to address this/these problem(s) are identified and discussed below.

SUMMARY OF THE INVENTION

It is an object of the power conservation apparatus to conserve power that can be wasted. The power conservation allows for all or nearly all the energy to remain in the system for future or stored use. This allows for the power to be transferred between multiple storage systems without being completely depleted. The system monitors the use and storage systems to determine where and when to transfer stored power and charging.

It is an object of the power conservation apparatus to include two or more separate batteries or battery storage systems. As one battery is being used, as second or more battery is charging. Two separate batteries are used as a minimum, but more than two separate battery systems can be used for charging, use and storage. The battery storage size or amperage and voltage is selected based upon the maximum power demand. The two or more separate battery systems are connected or selected by a controller.

It is another object of the power conservation apparatus to include controller and in some embodiments a programmable logic controller or PLC. The controller provides two functions. The first function is to monitor the voltage of each separate storage batteries to determine the charge level and the amount of available power remaining in each separate storage batteries. The second function of the controller is to switch between the separate storage batteries at the optimal voltage to maintain power to the entire system.

It is still another object of the power conservation apparatus to power a house/building. The system operates to provide power to the house/building by monitoring and controlling available power systems including the separate storage batteries, solar panels, charge controller, controller, and inverter to provide continuous power to the house/building.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
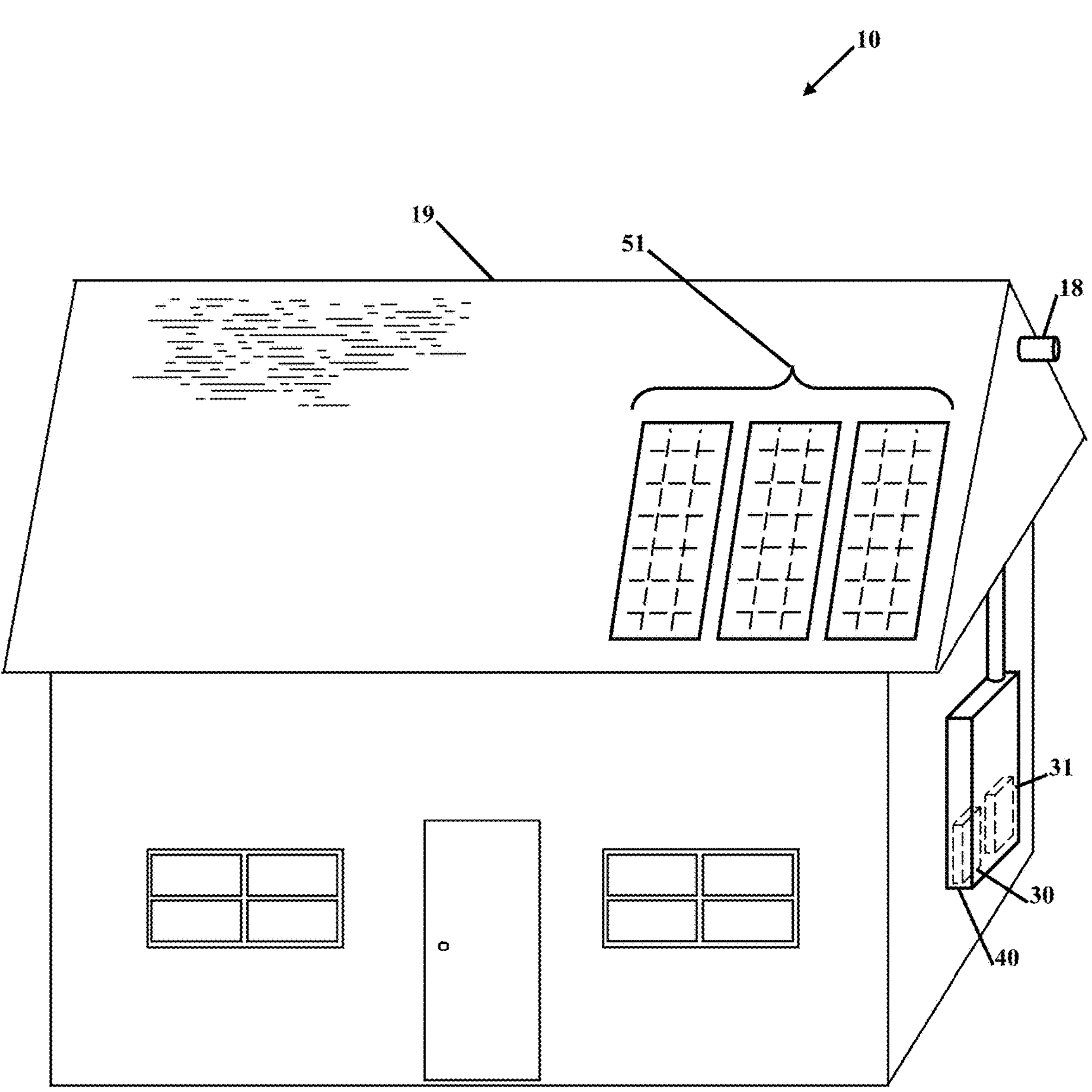
FIG. 1 shows a house/building with the power conservation apparatus.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms “a,” “an,” and “the” are intended to include the plural forms as well, unless the context clearly indicates otherwise.

It will be further understood that the terms “comprises,” “comprising,” “includes,” and/or “including,” when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters.

| Item Numbers and Description | |
|---|---|
| 10 apparatus with a house | 11 power conservation apparatus |
| 18 utility connection | 19 house or building |
| 20 PLC | 21 switch 1 |
| 22 switch 2 | 30 battery 1 |
| 31 battery 2 | 32 battery 1 charge level |
| 33 battery 2 charge level | 40 utility box |
| 42 inverter | 43 outlets |
| 50A-50D battery | 51A-51C solar panel |
| 60 charge controller | 61 charger |
| 62 step up/down charger | 63 resistance |
| 70 charge graph | 71 low voltage |
| 72 high voltage | 73 first transition |
| 74 second transition | 75 third transition. |
| 100 flow chart | 110 start |
| 112 measure bat1 | 114 voltage test |
| 116 measure bat2 | 118 charge bat1 |
| 120 voltage test | 122 measure bat1 |
| 124 full charge | 126 measure bat2 |
| 128 low voltage | 130 transition |
| 132 measure bat2 | 134 full charge |
| 136 measure bat1 | 138 low voltage |
| 140 transition. | |

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

FIG. 1 shows a house/building with the power conservation apparatus with a house 10. This figure shows one contemplated embodiment of installation on a house or building 19. On the roof of this particular house or building 19 are solar panels 51. While three solar panels 51 are shown there could be less than three solar panels 51 or more than three solar panels 51 depending upon the installation or power requirements. Solar panels 51 are one method of providing an initial charge to the system, but other methods are shown and describe in other figures and description herein. This figure also shows a utility connection 18 that can provide an initial charge to the system. The side of the house or building 19 shows an externally mounted utility box 40 housing battery 1 30 and battery 2 31. These two separate batteries 30 and 31 provide the power basis for powering the house or building 19 through a controller (shown in other figures herein.

Figure 2:
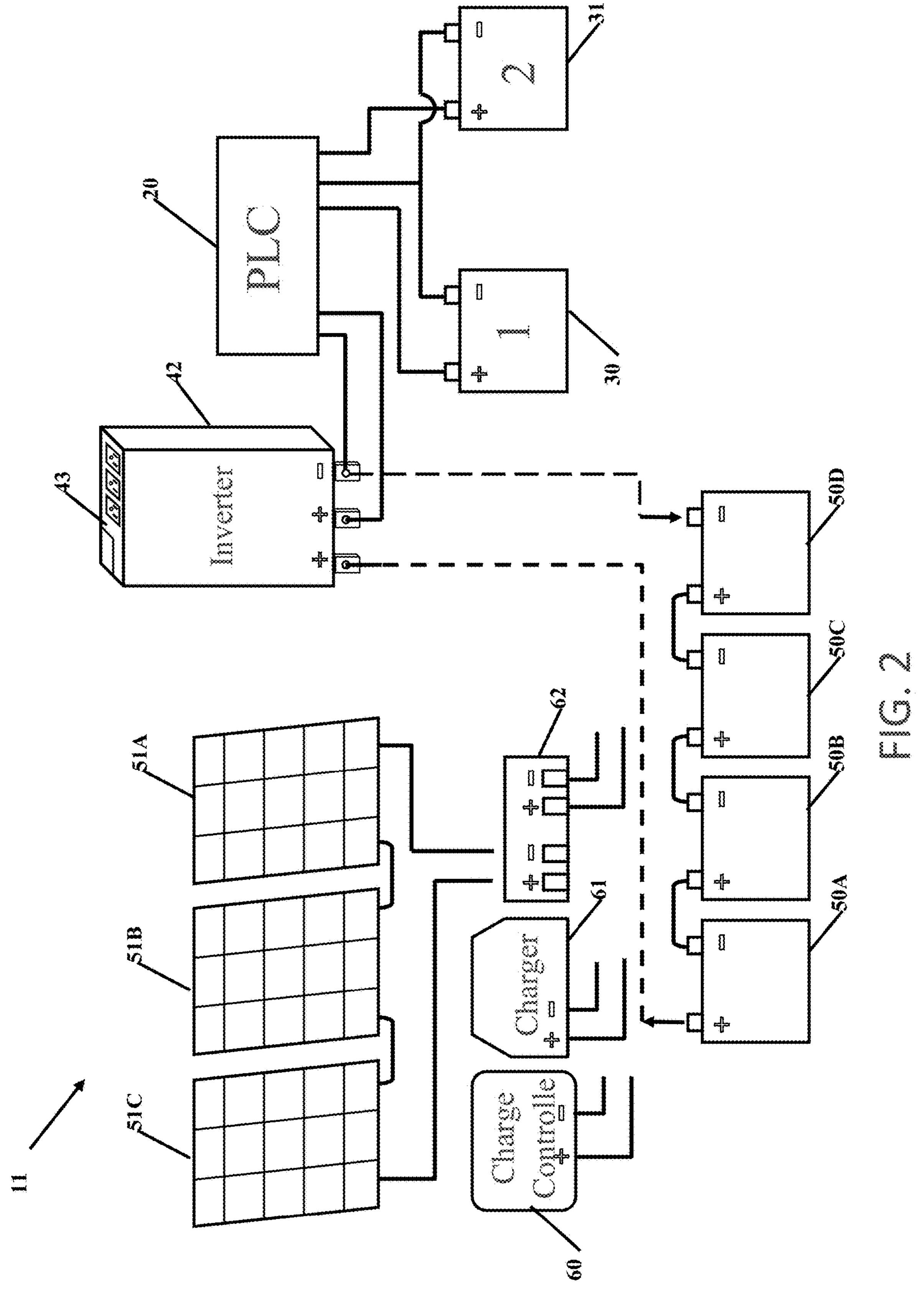
FIG. 2 shows a pictorial diagram of a power conservation apparatus.

FIG. 2 shows a pictorial diagram of a power conservation apparatus 11 in a preferred embodiment. The main control of the power conservation apparatus 11 is with the programmable logic controller or PLC 20 that controls charging and use of the two separate batteries, battery 1 30 and battery 2 31. Operation and control of the PLC 20 is shown and described in other figures and description herein. The PLC 20 provides a constant power to an inverter 42 having outlets 43 or is connected to the electrical panel of a house or building. A general description of the operation of the PCL 20 is to charge one battery while using the power from the other battery. When one battery is discharged the PLC 20 will switch the use to the charged battery and then charge the discharged battery. Alternating between the two batteries 30, 31 ensures that at neither battery is completely discharged and unable to provide power to the inverter 42.

Upon start-up (or other conditions) the power conservation apparatus 11 requires some initial charge to get at least one of the batteries 30, 31 to an initial charged condition. The power conservation apparatus 11 shows three methods to provide the initial charged condition.

One method is with the use of solar panel(s) 51A, 51B and 51C. While three solar panels 51 are shown there could be less than three solar panels 51 or more than three solar panels 51 depending upon the installation or power requirements. The use of three solar panels 51 in this embodiment is selected to provide 48 volts for the four 12-volt batteries 50A-50D. This configuration is common with current solar charging systems. The solar panels 51A-51C connect through a charge controller 60 to the batteries 51A-51C. Other combinations of solar panels, charge controllers and batteries are contemplated.

Another method to charge the batteries 50A-50D is with a charger 61 that can use external power to charge the batteries 50A-50D. These chargers 60 typically provide 12-volt output voltage to charge a battery. Still another contemplated charging is with a step-up or step-down inverter 62 that alters incoming voltage to charge batteries 50A-50D. While the system shows and described four batteries 50A-50D, the system can be fabricated using a single battery, two, three or more than four batteries. The voltage of the battery is not fixed at 12 volts, and single batteries of 48 volts are contemplated and available. The batteries can be wired in series or parallel to achieve a desired voltage, current and or power capacity. The bank of batteries 50A-50D is wired to the inverter 42 that supplies power to-from the PLC 20.

Figure 3:
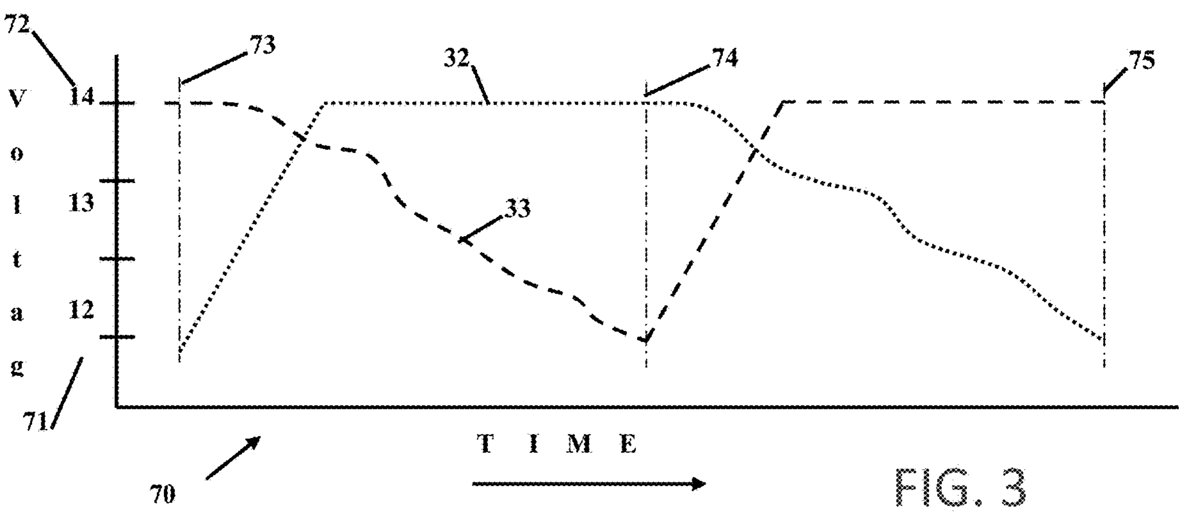
FIG. 3 shows graphs for the battery charging, discharging and power switch-over.

FIG. 3 shows graphs for the battery charging, discharging and power switch-over 70. This graph is a contemplated embodiment showing the charge status of the two separate batteries 30 and 31 (shown in previous figures) and now shown as battery 1 charge level 32 and battery 2 charge level 33 respectively. The charge graph 70 shows time on the horizontal or X axis and voltage in the vertical or Y axis. The charge levels or voltages of the two separate batteries 32 and 33 are shown as separate line plots. While the low voltage 71 level is shown as 11 volts and the high voltage 72 levels are shown as 11 volts and 14 volts respectively, other voltages can be used. This graph shows a representative example for the propose of illustration. The graph starts at the left with a first transition 73 where battery 1 charge level 32 has reached a low voltage 71 transition level and the PLC begins to use battery 2, and charge battery 1.

The load of the house or building will alter the rate of discharge. The discharge rates of battery 1 or battery 2 is not shown as a linear line due to the discharge and use rate within the house or building. The charge rate or battery 1 or battery 2 is shown as a linear rate until the battery is completely charged and can remain charged until the batter being used reaches a low voltage 71. Transition 74 shows when battery 2 charge level 33 is at the low voltage 71 level and the PLC transitions 74 to using battery 1 and begins charging battery 2. A third transition 75 is shown as the PLC transitions 75 to again using battery 2 and begins charging battery 1, that essentially will repeat continuously.

Figure 4:
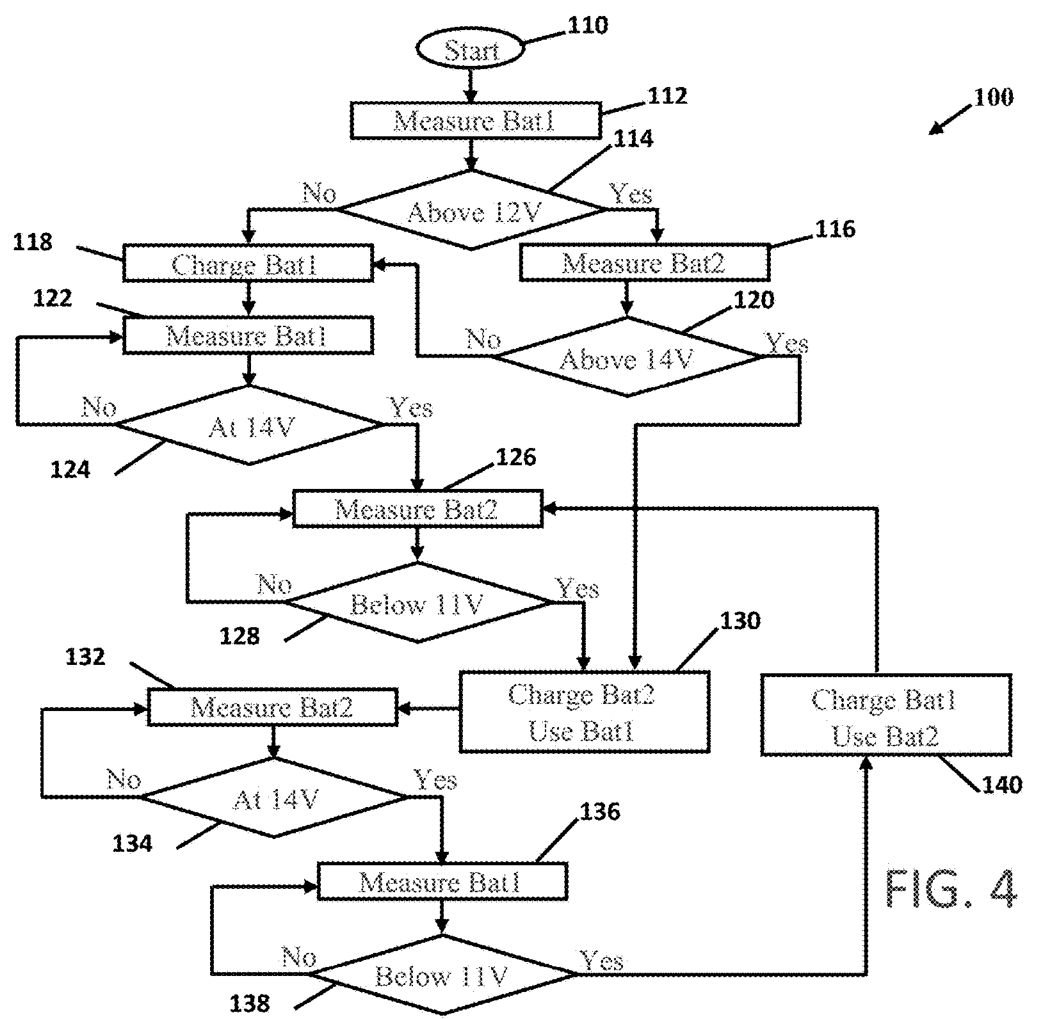
FIG. 4 shows a flow chart block diagram of the PLC controller.

FIG. 4 shows a flow chart 100 block diagram of the PLC controller. While a PLC controller is shown and described in this flow chart 100, other computers, controller or apparatus can be used to accomplish a similar or equivalent process. In this flow chart 100 the system will start 110 with the batteries in an unknown charged condition. The system arbitrarily starts with battery 1 to determine the charge condition. It is possible that one or both batteries can begin fully charged. After the start 110 the PLC will measure the voltage level of battery 1 112. A level above 12 volts indicate that there is some charge to battery 1. If the voltage is above 12 volts 114 then the PLC will measure the voltage at battery 2 116. This essentially determines what batter should be charged first. If the voltage of battery 1 is below 11 volts or another discharge level that indicates the battery(ies) are discharged, then battery 1 will be charged 118. If battery 1 is above 14 volts 120 or another charge level that indicates the battery(ies) are fully charged, then the PLC will switch to charging battery 2 and using battery 1 130.

Again, if the voltage of battery 1 is below 12 volts, then battery 1 will be charged 118. The voltage of battery 1 will be measured 122 until it reaches 14 volts 124 or another charge level that indicates the battery(ies) are fully charged and then the PLC will start to measure the voltage of battery 2 126 until the voltage of battery 1 126 is at or below 11 volts 128 or another discharge level that indicates the battery(ies) are discharged, thereby indicating that battery 2 is at a low threshold. The PLC will switch to charging battery 2 and using battery 1, 130. At least one of the batteries is now fully charged and the PLC will alternately transition between using batteries with the battery being used is discharged to 11 volts or another discharge level that indicates the battery (ies) are discharged.

At this stage, the PLC will measure the voltage of battery 2 132 until it reaches 14 volts 134 or another charge level that indicates the battery(ies) are fully charged, thereafter the PLC will measure battery 1 136 until battery 1 is below 11 volts 138 or another discharge level that indicates the battery(ies) are discharged which will again result in a transition whereby battery 1 will be charges and battery 2 will be used 140.

Figure 5:
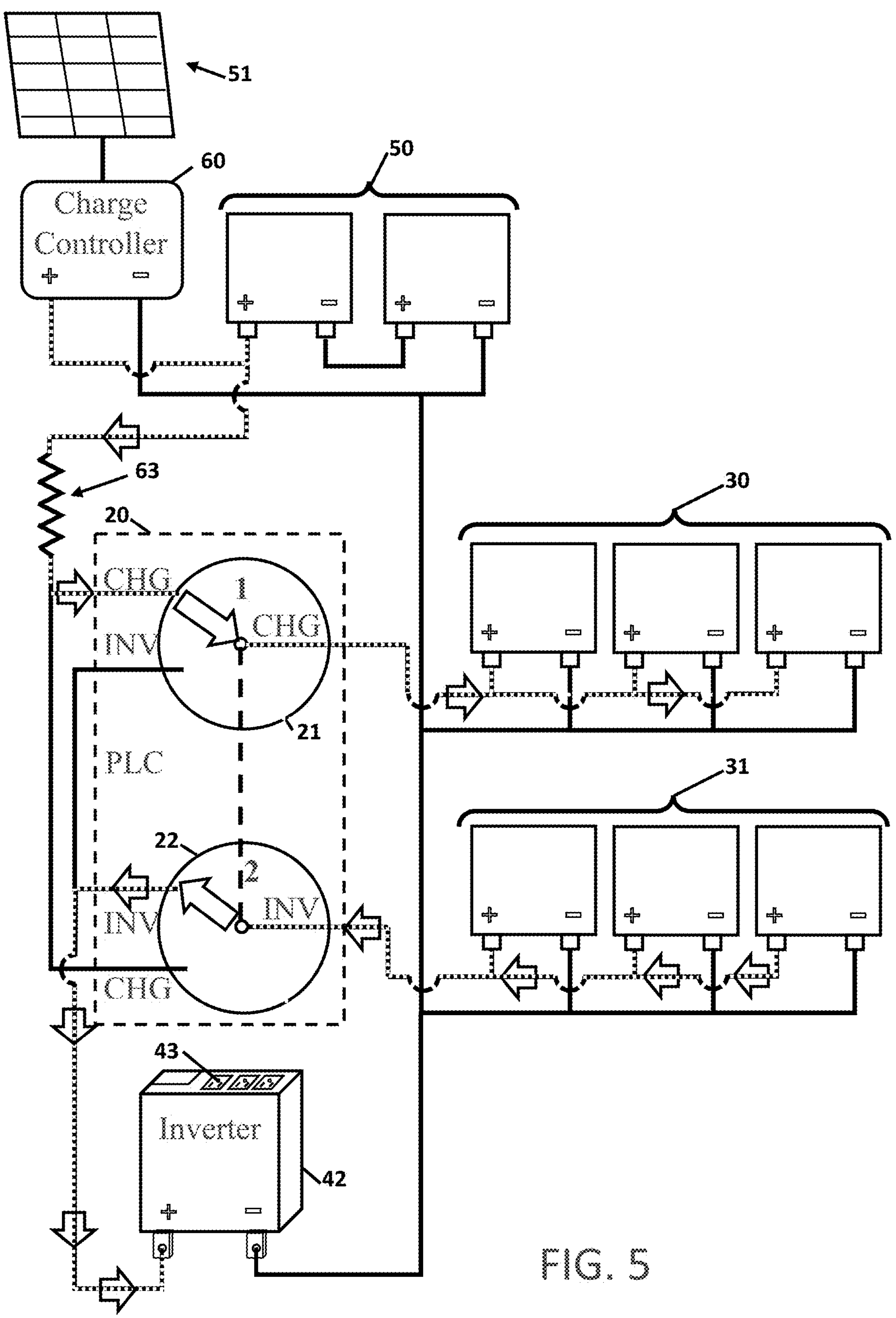
FIG. 5 shows a connection schematic of the power conservation apparatus.

FIG. 5 shows a connection schematic of the power conservation apparatus. This figure shows that the generation of power from the solar panel(s) 51 or a charger connects through a charge controller 60 to charge batteries 50, shown connected in series. In this embodiment there are two 12-volt batteries to create a 24-volt system, but the system could be with four 12-volt batteries to make a 48-volt system. The power from the batteries 50 provide storage and a more constant source of power to the system. Power from the batteries then passes through a resistor 63 but could optionally be a charge controller.

The resistor 63 or additional charge controller converts the 24 volts from the batteries to a lower voltage to charge one of the banks of 12-volt batteries 30 or 31 that are shown connected in parallel. When the apparatus uses four 12-volt batteries 50, the battery banks 30 and 31 operate as a 24-volt system. While specific voltages of 12, 24 and 48 volts have been specified, essentially the minimum voltage from the battery(ies) 50 needs to be greater than the maximum charge in battery(ies) 30/31. The power from the battery(ies) 50 through the resistor charges the battery packs 30/31 in an alternating pattern.

The alternating pattern is controlled by the programmable logic controller (PLC) 20. In the present setting the power through the resistor 63 runs through selector switch 1 21 and into battery(ies) 30 to charge the battery(ies) 30. At the same time selector switch 2 22 is set so power from the battery(ies) 31 runs through the selector switch 2 22 and into the inverter 42 to run devices connected into outlet(s) 43. When the battery(ies) 30 are sufficiently charged the PLC 20 will switch the settings of selector switches 1 21 and 2 22 to the inverse position. In this inverse position power through the resistor 63 runs through selector switch 2 22 and into battery(ies) 31 to charge the battery(ies) 31. At the same time selector switch 1 21 is set so power from the battery(ies) 30 runs through the selector switch 1 21 and into the inverter 42 to run devices connected into outlet(s) 43. The operation of the PLC 20 is shown and described in the FIG. 4 flow chart.

Thus, specific embodiments of a power conservation apparatus have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A power conservation apparatus comprising:

a power producing device connected to a charge controller;

said charge controller connected to at least two batteries that are wired in series;

said at least two batteries connected to a resistance;

said resistance being connected to a controller that measures and alternatively charges and uses power from at least two separate batteries;

said controller alternatively charges or uses power from only one of said at least two batteries based upon a charge and discharge level of each of said at least two separate batteries such that a first battery is being used while a second battery is being charged;

alternatively said first battery is being charged while said second battery is being used;

whereby only said first battery or said second battery is being charged, and said at least two separate batteries are alternately connected to a power inverter that is connected to at least one outlet that powers a house or building.

2. The power conservation apparatus according to claim 1, wherein said power producing device provides an initial charging system to provide at least an initial full charge to said first battery or said second battery.

3. The power conservation apparatus according to claim 1, wherein said power producing device is at least one of a solar panel, a charger, a charge controller, or an inverter power supply.

4. The power conservation apparatus according to claim 1, wherein a minimum voltage of said at least two batteries is greater than a maximum voltage of either of said at least two separate batteries.

5. The power conservation apparatus according to claim 4, wherein said at least two batteries has a nominal voltage of 24-volts.

6. The power conservation apparatus according to claim 5, wherein said at least two separate batteries each have a nominal voltage of 12 volts.

7. The power conservation apparatus according to claim 4, wherein said at least two batteries has a nominal voltage of 48-volts.

8. The power conservation apparatus according to claim 7, wherein said at least two separate batteries each have a nominal voltage of 24 volts.

9. The power conservation apparatus according to claim 4, wherein said at least two batteries has a nominal voltage of 48-volts.

10. The power conservation apparatus according to claim 9, wherein said at least two separate batteries each have a nominal voltage of 36 volts.

11. The power conservation apparatus according to claim 1, wherein said controller is a programmable logic controller or PLC.

12. The power conservation apparatus according to claim 11, wherein one of said resistance is reduced a voltage of said at least two batteries to a charge voltage to charge one of said at least two separate batteries.

13. The power conservation apparatus according to claim 12, wherein said resistance is a second charge controller connected to one of said at least two separate batteries.

14. The power conservation apparatus according to claim 1, wherein said charge level is at least 14 volts DC.

15. The power conservation apparatus according to claim 14, wherein said discharge level is below 11 volts DC.

16. The power conservation apparatus according to claim 1, wherein said at least two separate batteries are multiple batteries connected in parallel.

* * * * *